US012570202B2

(12) United States Patent
Chen et al.

(10) Patent No.: US 12,570,202 B2
(45) Date of Patent: Mar. 10, 2026

(54) FOLDABLE SUNKEN HOUSE STRUCTURE

(71) Applicant: A&C FUTURE, INC., Newport Beach, CA (US)

(72) Inventors: Shoue Chen, Irvine, CA (US); Sichen Li, Santa Ana, CA (US); Zhuangboyu Zhou, Santa Ana, CA (US); Jiuqi Wang, Santa Ana, CA (US); Yulai Shi, La Puente, CA (US); Ju Gao, Newport Beach, CA (US); Han Qin, Newport Beach, CA (US); Jiayang Qin, Newport Beach, CA (US)

(73) Assignee: A&C FUTURE, INC., Irvine, CA (US)

( * ) Notice: Subject to any disclaimer, the term of this patent is extended or adjusted under 35 U.S.C. 154(b) by 354 days.

(21) Appl. No.: 18/321,599

(22) Filed: May 22, 2023

(65) Prior Publication Data

US 2024/0391376 A1 Nov. 28, 2024

(51) Int. Cl.
B60P 3/34 (2006.01)

(52) U.S. Cl.
CPC ..................................... B60P 3/34 (2013.01)

(58) Field of Classification Search
CPC ....................................................... B60P 3/34
See application file for complete search history.

(56) References Cited

U.S. PATENT DOCUMENTS

| | | | |
|---|---|---|---|
| 3,346,295 A | 10/1967 | Byer | |
| 3,770,297 A | 11/1973 | Quick | |
| 3,774,955 A | 11/1973 | Byer | |
| 4,085,959 A | 4/1978 | Dimick | |
| 4,250,906 A * | 2/1981 | Rivier | B60P 3/341 |
| | | | 296/168 |
| 5,080,426 A * | 1/1992 | Johnson | B60P 3/341 |
| | | | 296/168 |
| 5,934,738 A | 8/1999 | Welles | |
| 5,984,396 A | 11/1999 | Schneider | |
| 6,722,726 B1 * | 4/2004 | Parmer | B60P 3/06 |
| | | | 296/26.02 |
| 8,167,329 B2 | 5/2012 | Lee | |
| 2007/0262611 A1 * | 11/2007 | Freeman | B60P 3/341 |
| | | | 296/168 |
| 2015/0246699 A1 * | 9/2015 | Anabtawi | B60D 1/06 |
| | | | 280/504 |
| 2018/0162259 A1 * | 6/2018 | Lin | B60P 3/42 |

* cited by examiner

*Primary Examiner* — Taras P Bemko
(74) *Attorney, Agent, or Firm* — INNOVATION CAPITAL LAW GROUP; Vic Lin

(57) ABSTRACT

An expandable home structure includes a main structure and a first expansion section that is expandable outward in a first direction from a first side of the main structure. Once the expansion section is expanded, coverage members can unfold from a bottom of the floor member and the floor member can be lowered within the unfolded coverage members, thus providing a sunken floor for the expanded section. The floor member may fold vertically against the main section in the folded configuration. After the front and rear walls are unfolded from the main section, the outer wall of the expansion section can be moved outward from the main section to cause the floor member to lower into its horizontal, expanded, and raised position. The coverage members can be unfolded from the bottom of the floor member and the floor member can be lowered.

18 Claims, 17 Drawing Sheets

104

102

FOLDABLE SUNKEN HOUSE STRUCTURE

BACKGROUND OF THE INVENTION

1. Field of the Invention

Embodiments of the invention relate generally to expandable structures. More particularly, embodiments of the invention relate to an expandable house structure that includes a foldable side expansion space and a floor of the expansion section that can lower to form a sunken room.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Recently, the expandable house structure is attracting more attention both in the fields of mobile homes and recreational vehicles (RVs). The expansion mode will determine the effective living area, complexity of the driving and control system, and cost for purchase and maintenance. Exploring a concise and reliable folding/expansion mechanism is of great importance. Often, expansion sections, such as recreational vehicle slide-outs, have a slightly raised floor (to permit sliding inward over the main section floor) or are designed to be level with the remainder of the home.

Referring to FIGS. 1A and 1B, many times, an expansion section 104 of an expandable home 100, especially for larger area expansion sections, requires supports 102 that can support at least an outer edge of the expansion section 104 on the ground. Such supports 102 add complexity to the expansion section, adds weight to the vehicle, and keeps the floor at a raised level.

In view of the foregoing, there is a need for an expandable house structure that can expand living space while providing a sunken room in the expansion section.

SUMMARY OF THE INVENTION

Embodiments of the present invention aim to solve the aforementioned problems in conventional expandable structures by providing a structure that permits the expansion section to unfold from the main structure and to permit the floor to lower to a lower level, perhaps even to a ground level for added support.

Embodiments of the present invention provide an expandable home comprising a main structure; an expansion section, the expansion section expandable outward in a first direction from a first side of the main structure; and a floor structure folding adjacent the main structure in a folded configuration and movable vertically downward once the expansion section is unfolded to the expanded configuration.

Embodiments of the present invention provide an expandable home comprising a main structure; an expansion section, the expansion section expandable outward in a first direction from a first side of the main structure; a floor structure folding adjacent the main structure in a folded configuration and movable vertically downward once the expansion section is unfolded to the expanded configuration; front and rear coverage walls foldable against an underside of the floor structure in the folded configuration, and extending downward from a front and rear edge of the floor structure in the expanded configuration; left and right coverage walls foldable against an underside of the floor structure in the folded configuration, and extending downward from a left and right edge of the floor structure in the expanded configuration; floor retention tabs extending inward from an inside surface along a lower edge of the front and rear coverage walls and/or the left and right coverage walls, the floor retention tabs supporting an edge of the underside of the floor structure when the floor structure is lowered to a sunken position; widthwise slots formed in the underside of the floor structure, the widthwise slots operable to receive the floor retention tabs of the front and rear coverage walls when the front and rear coverage walls are in the folded configuration; lengthwise slots formed in the underside of the floor structure, the lengthwise slots operable to receive the floor retention tabs of the left and right coverage walls when the left and right coverage walls are in the folded configuration; and a lock locker formed in a recess in an underside of the floor structure, the lock locker housing a lock bar having ends movable between a first position, that locks the left and right coverage walls in a locked position when folded against the underside of the floor structure, and a second position, that permits the left and right coverage walls to move toward the expanded configuration, wherein the floor retention tabs of the left and right coverage walls includes holes formed therethrough; and the ends of the lock bar extend into the lengthwise slots and further extend through the holes in the floor retention tabs of the left and right coverage walls when the left and right coverage walls are in the folded configuration, thereby locking the left and right coverage walls into the folded configuration.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1A:
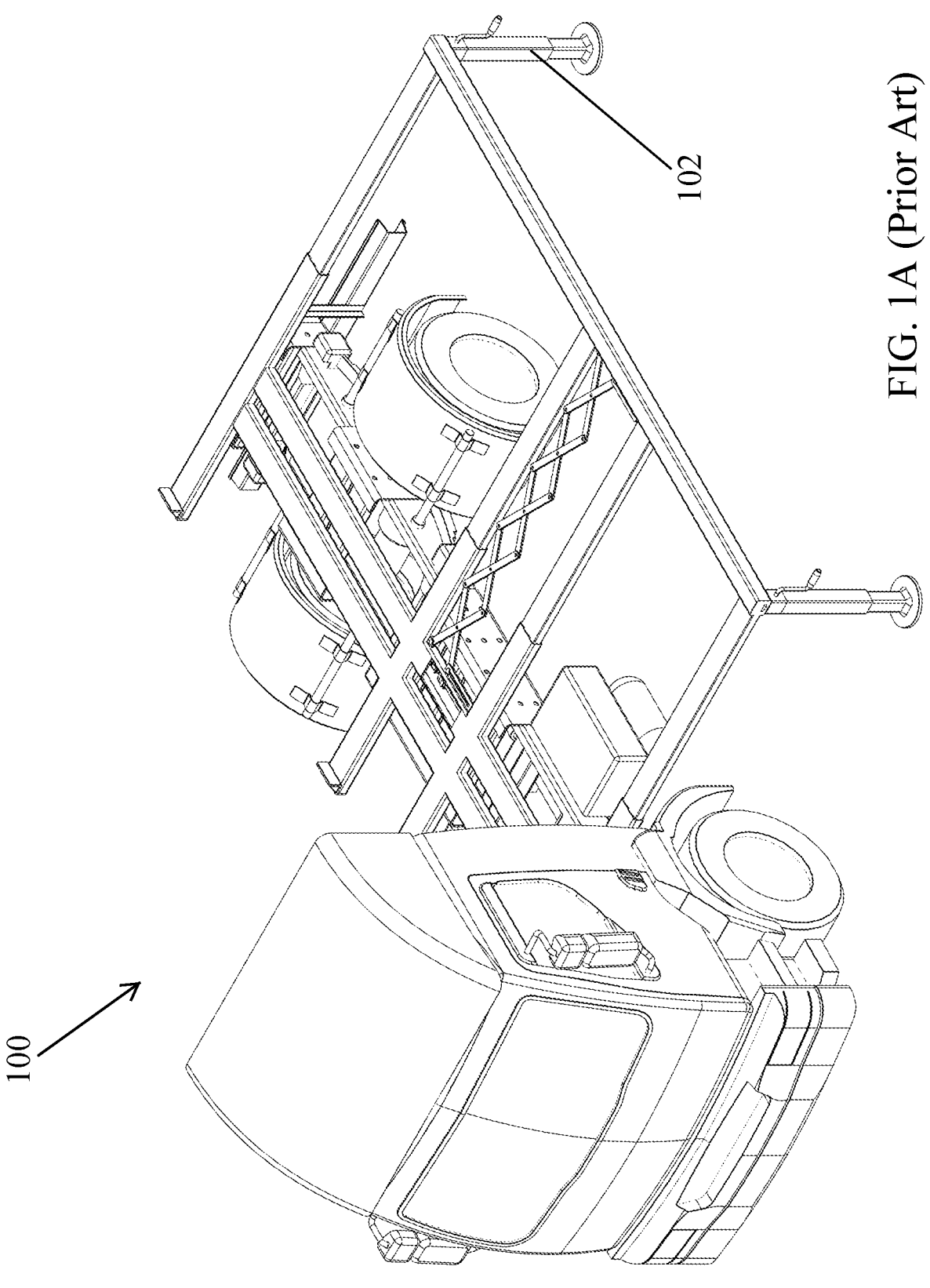
FIG. 1A illustrates an expandable mobile home frame structure according to the prior art.
Figure 1B:
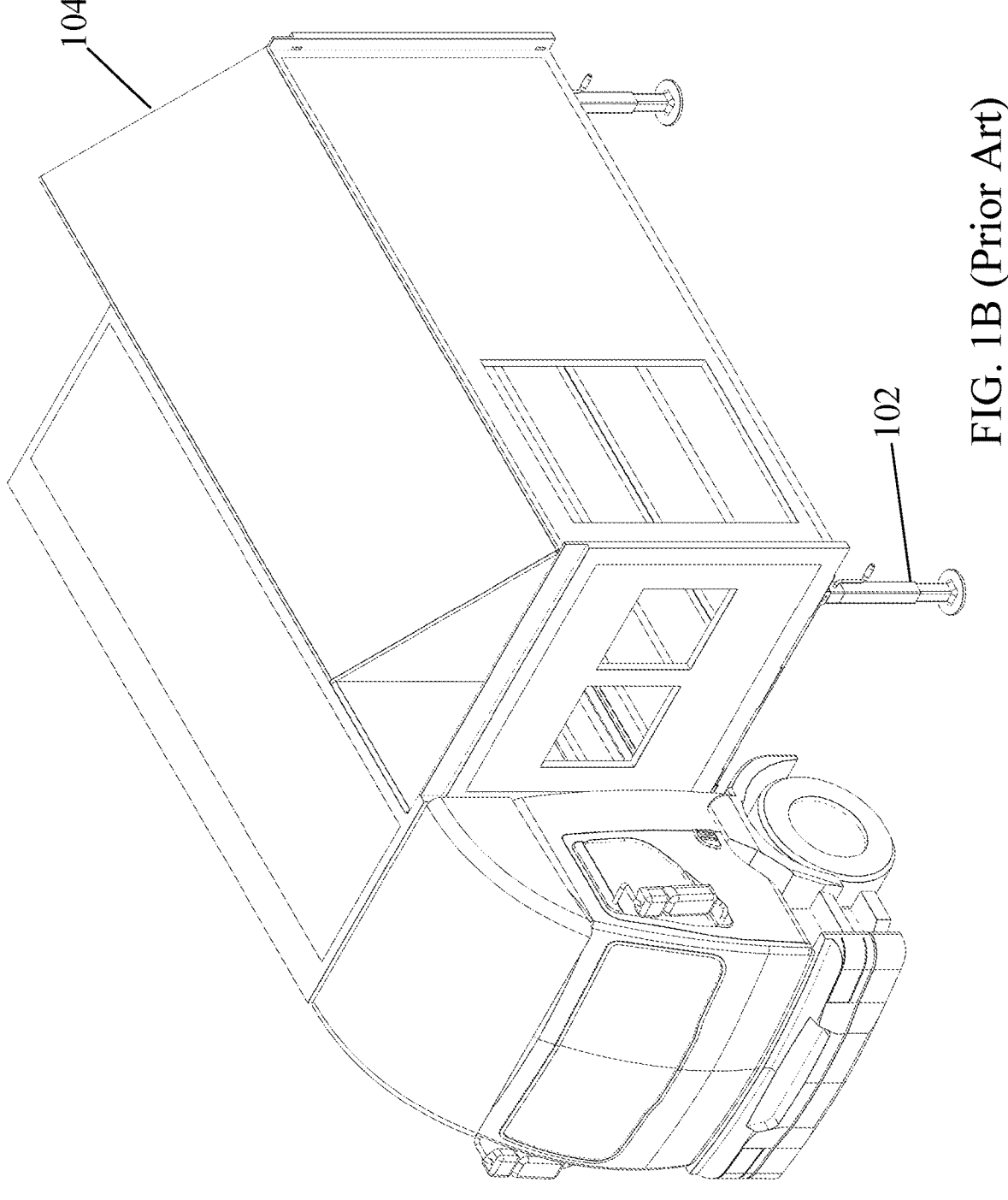
FIG. 1B illustrates a view of the expandable mobile home frame structure of FIG. 1A, with additional structure added thereto.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE
PREFERRED EMBODIMENTS AND BEST
MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an expandable home structure that includes a main structure and a first expansion section that is expandable outward in a first direction from a first side of the main structure. Once the expansion section is expanded, coverage members can unfold from a bottom of the floor member and the floor member can be lowered within the unfolded coverage members, thus providing a sunken floor for the expanded section. The floor member may fold vertically against the main section in the folded configuration. After the front and rear walls are unfolded from the main section, the outer wall of the expansion section can be moved outward from the main section to cause the floor member to lower into its horizontal, expanded, and raised position. The coverage members can be unfolded from the bottom of the floor member and the floor member can be lowered.

Figure 2:
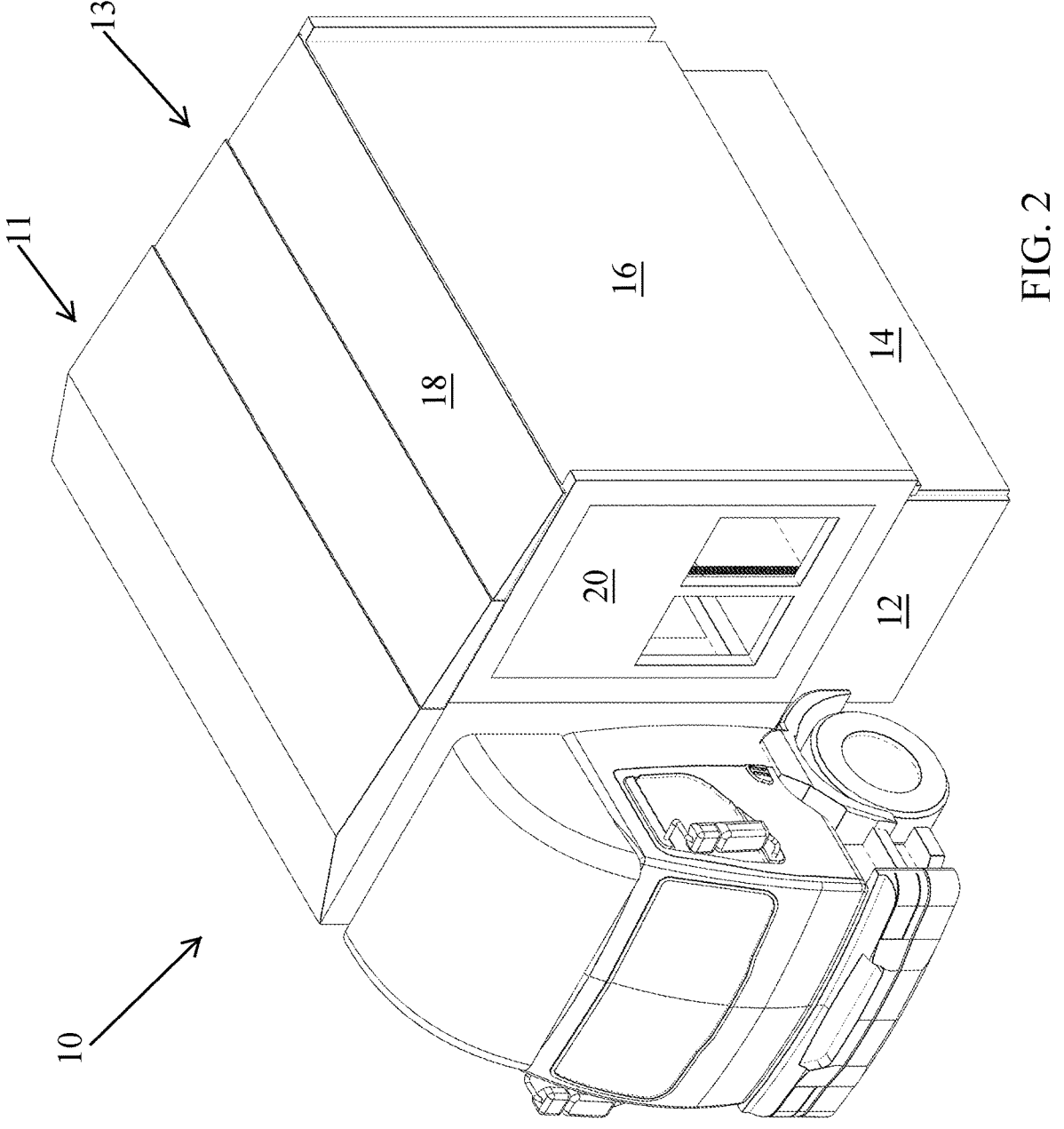
FIG. 2 illustrates an expandable home structure having a sunken expansion room, according to an exemplary embodiment of the present invention.

Referring to FIG. 2, an expandable home 10 can include a main section 11 and an expansion section 13. The expansion section 13 can include an outer wall 16 that moves from a folded configuration, adjacent the side wall of the main section 11, to an expanded configuration, expanded away from the main section 11. A front wall 20 can fold against the main section 11 in the folded configuration. Front and rear coverage walls 12 (only the front of which is shown in FIG. 2) and left and right coverage walls 14 (only the right of which is shown in FIG. 2) can be unfolded from the underside of a floor member, as described in greater detail below.

Figure 3A:
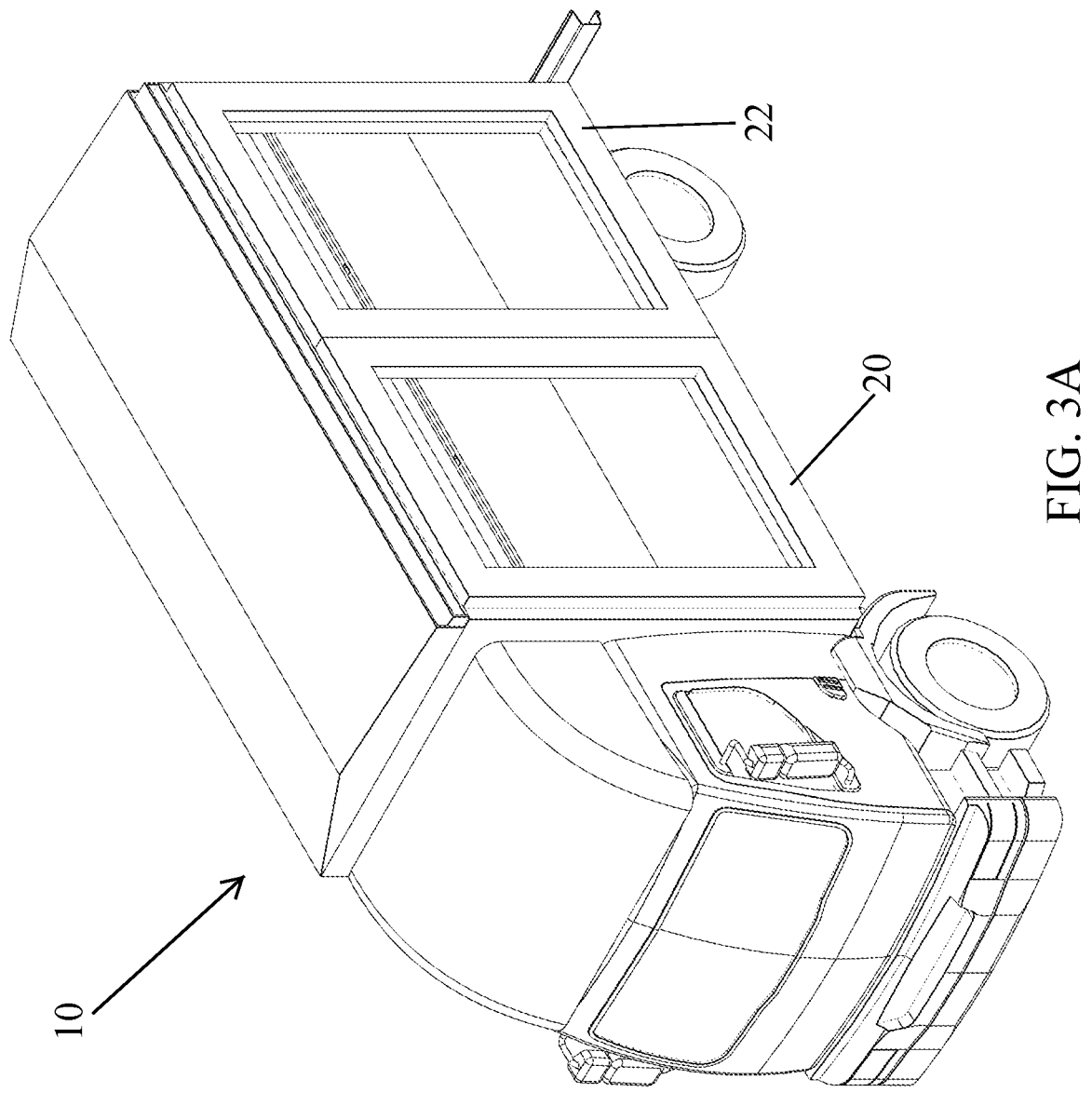
FIGS. 3A through 3E illustrate a pictorial representation of an unfolding process to create the expandable home structure of FIG. 2.
Figure 3B:
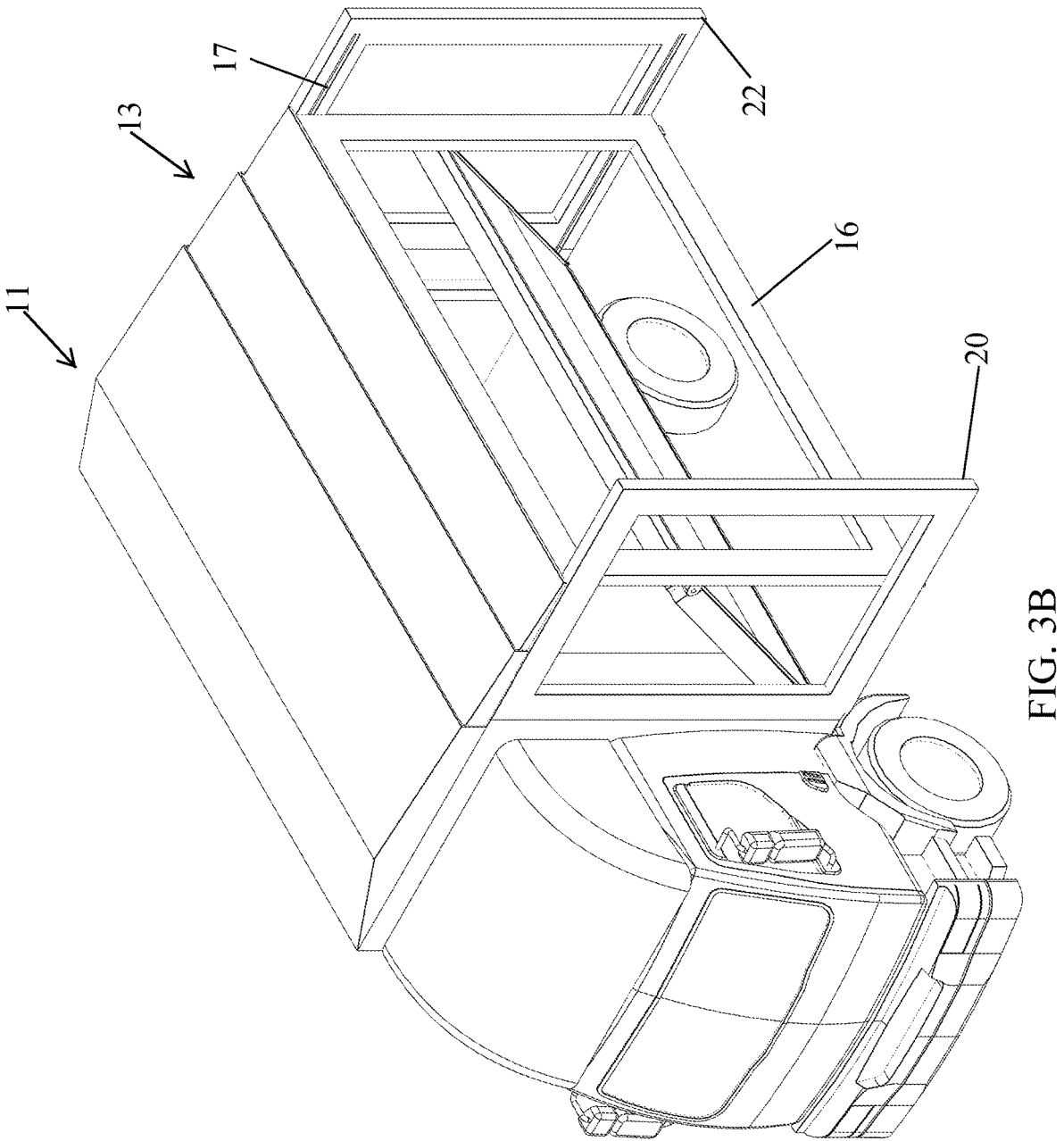
Figure 3C:
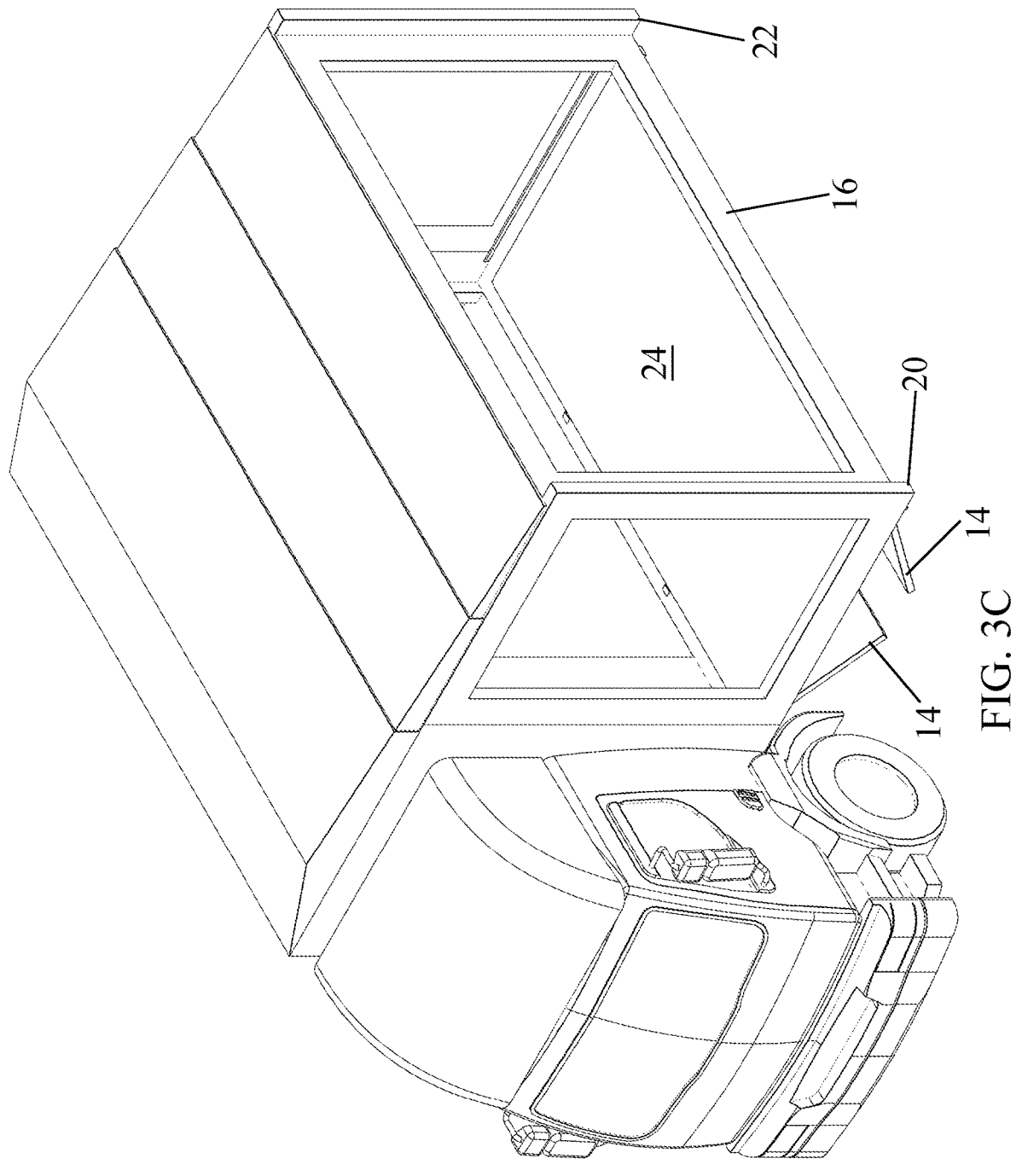

Referring to FIGS. 3A through 3E, the unfolding process for the expandable home 10 is shown. In the first step, in FIG. 3A, the front and rear expansion section walls 20, 22 can be unfolded from the folded configuration (generally parallel with a longitudinal axis of the main section) to extend outward from the side of the main section 11, typically at 90 degrees from the main section 11. After the front and rear expansion section walls 20, 22 are unfolded, the outer wall 16 can slide outward. There may be, for example, a track 17 provided along the front and rear expansion section walls 20, 22 for sliding the outer wall 16 therealong. As also shown in FIG. 3B, the floor member 24 may be folded against the main section 11, generally vertically, and may slide along the outer wall 16, as described in greater detail below, as the outer wall 16 is moved away from the main section 11. As can be seen, the roof structure 18 may also be attached to the outer wall 16 and may be retracted out of the roof of the main structure 11 as the outer wall 16 is moved outward, as shown in FIGS. 3B and 3C.

In FIG. 3C, the floor 24 is generally horizontal and spans between the outer wall 16 and the front and rear expansion section walls 20, 22. A lock mechanism, described in greater detail below, may be released and the left and right coverage walls 14 may pivot from their stowed configuration, where the left and right coverage walls 14 are disposed against and generally coplanar with the underside 24A of the floor 24, to their use position, where the left and right coverage walls 14 are disposed generally perpendicular with and at an outer edge of the floor 24, as shown in FIG. 3D.

Figure 3D:
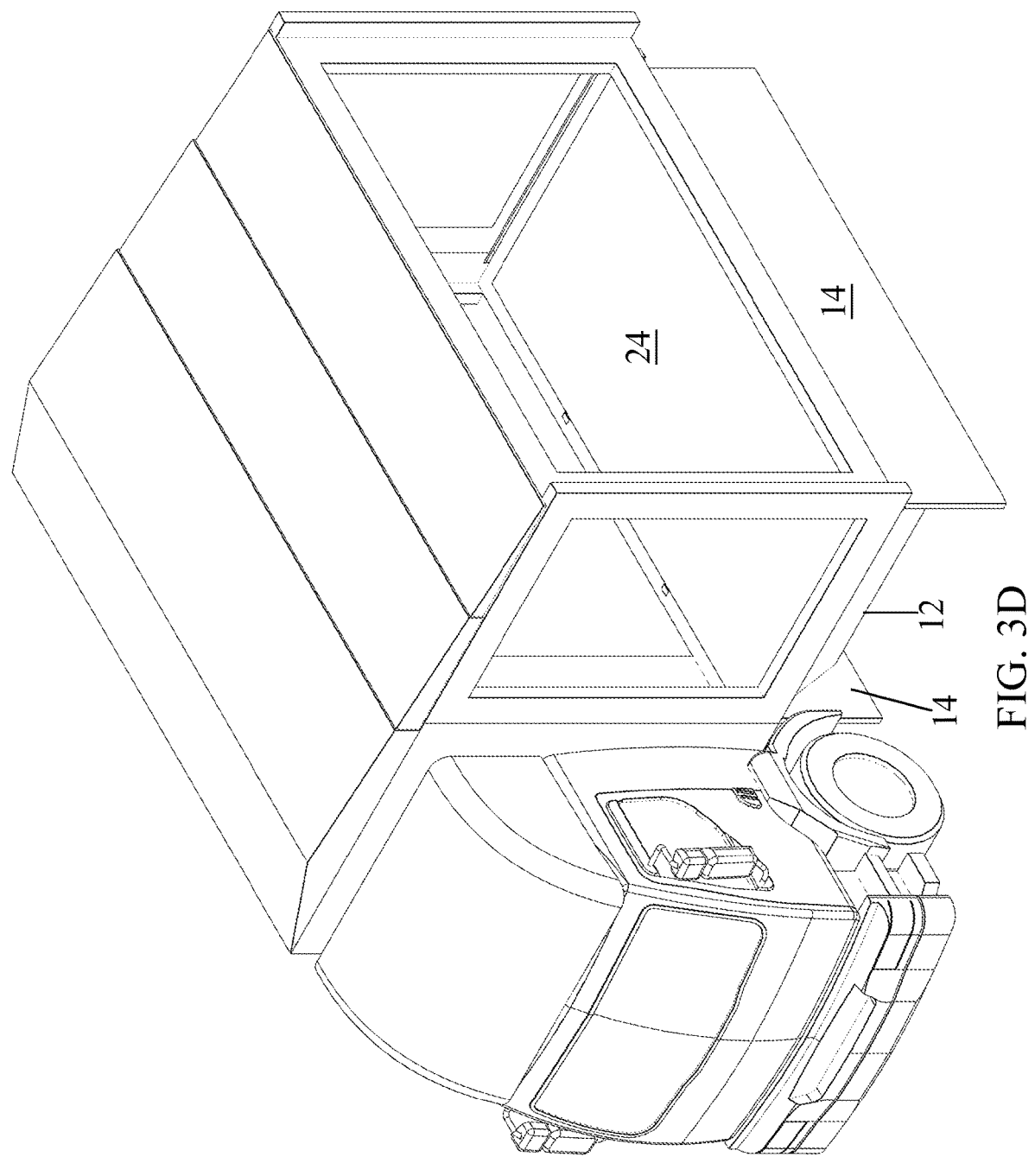
Figure 3E:
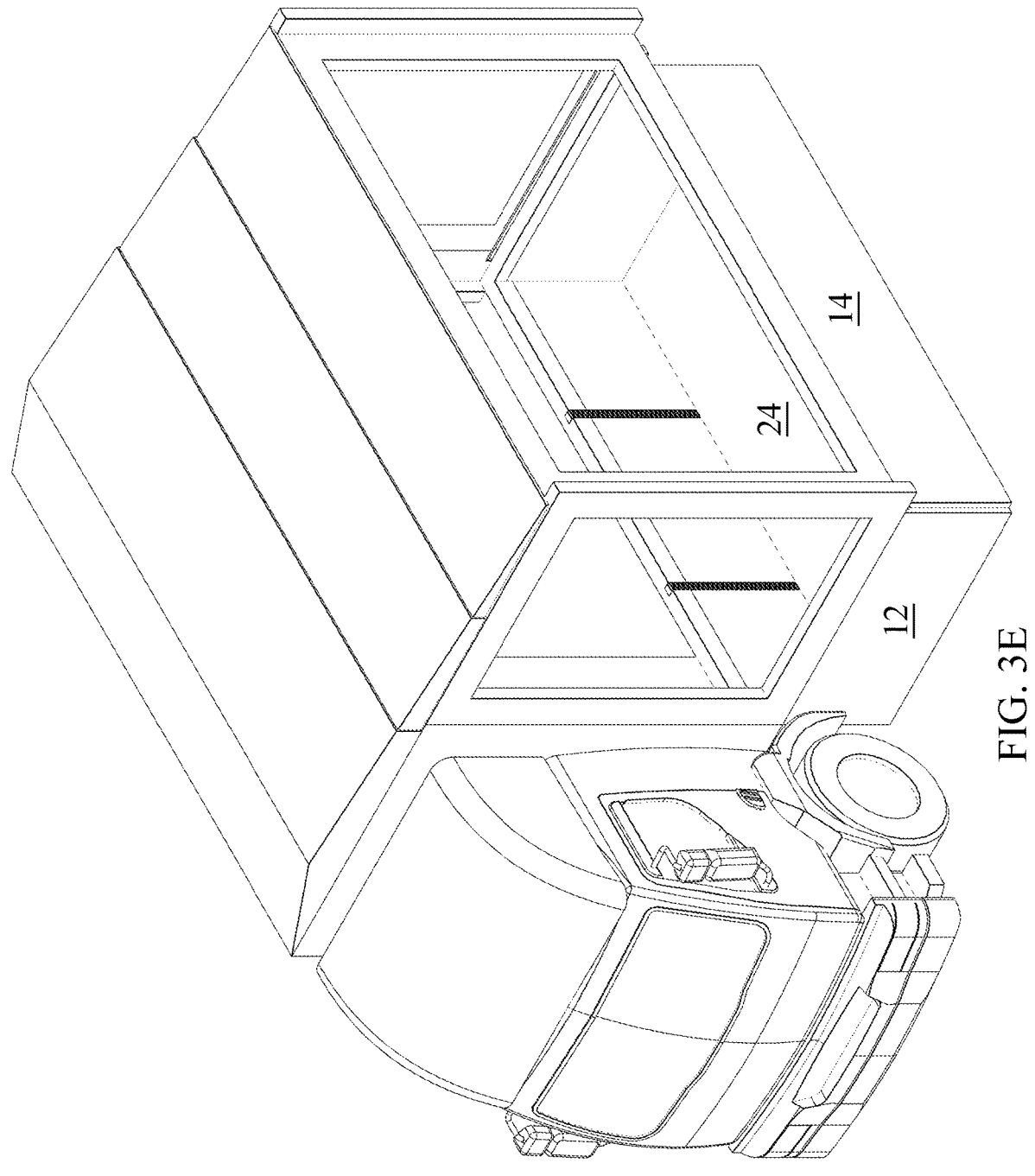

After the left and right coverage walls 14 are expanded, the front and rear coverage walls 12 may be expanded in a similar manner, as shown in the transition between FIGS. 3D and 3E. Once fully deployed, the coverage walls 12, 14 may provide an outer perimeter for a portion of the outer walls of the expansion section 13. In FIG. 3E, the floor 24 may be lowered to its sunken position, as described in greater detail below.

Figure 4A:
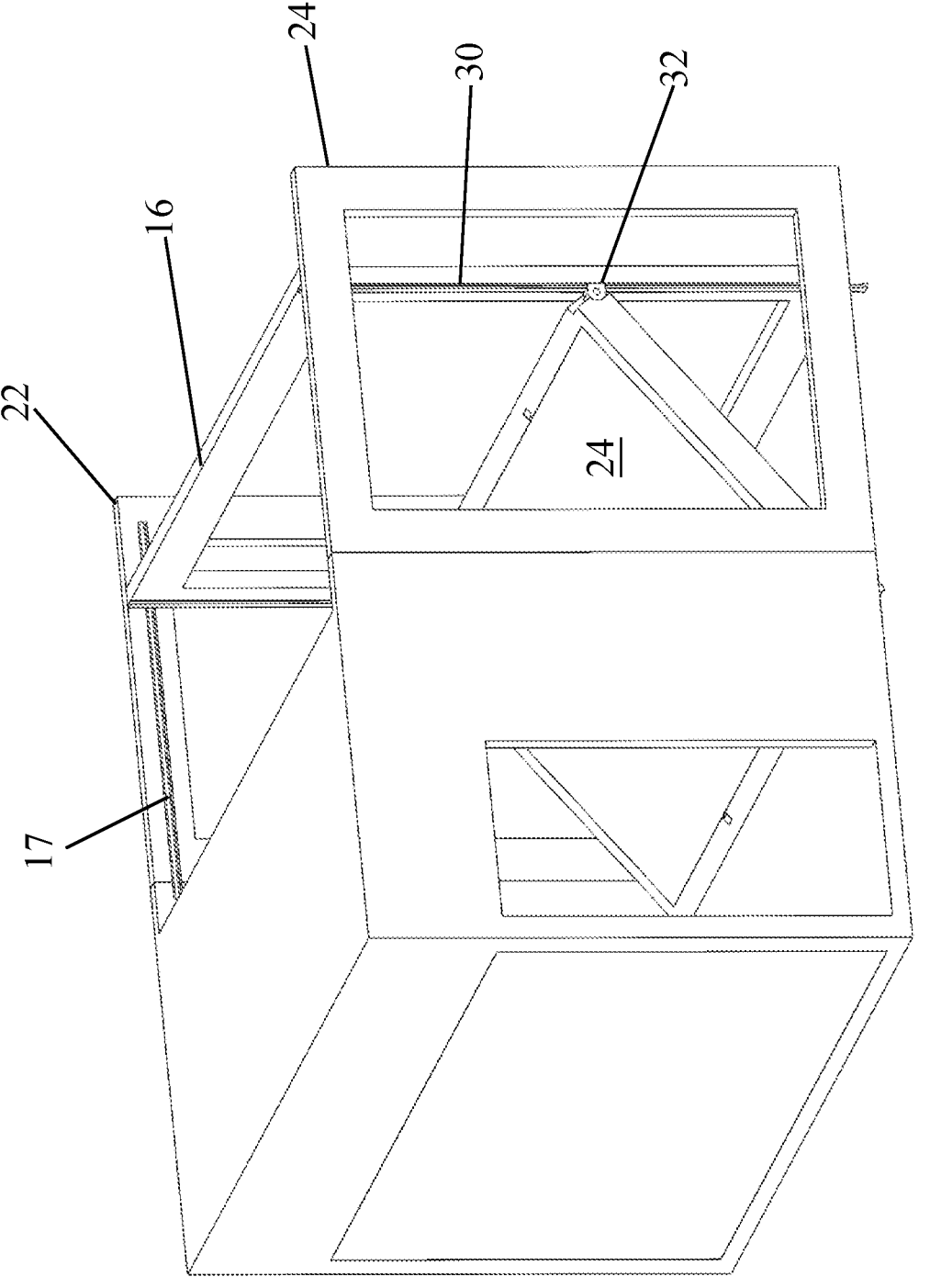
FIG. 4A illustrates the floor expansion in the expandable home structure of FIG. 2.
Figure 4B:
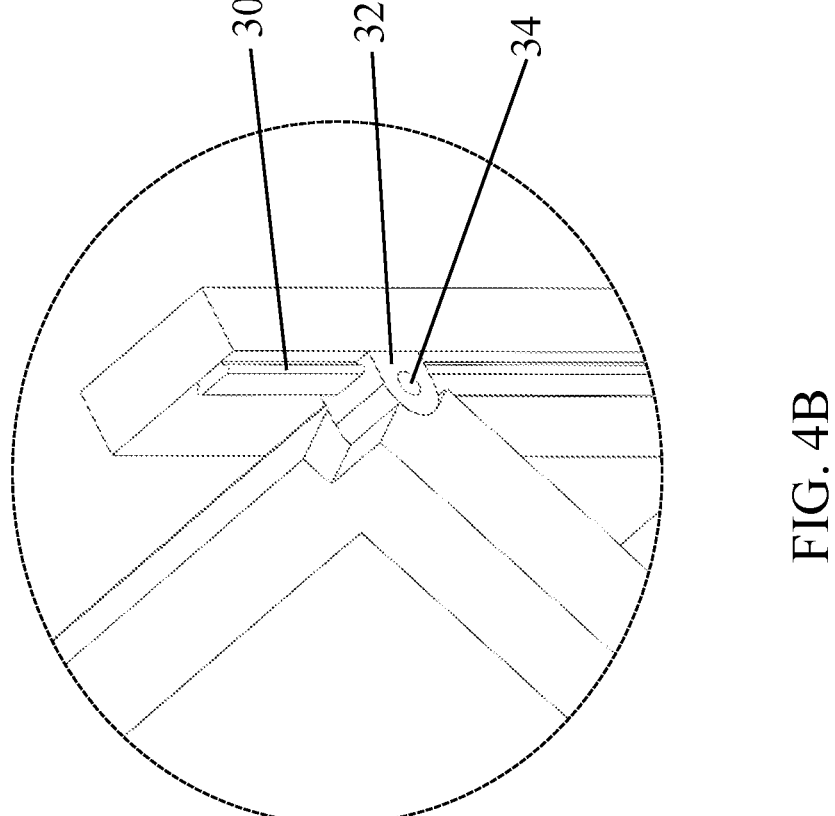
FIG. 4B illustrates a detailed view of the interaction of the floor member and the outer wall during expansion of the expandable home structure of FIG. 2.

Referring now to FIGS. 4A and 4B, details of the expansion of the floor 24 are provided. The floor 24 may be attached with a pivot connector 32 that may move in a vertical track provided in the outer wall 16. The pivot connector 32 may connect with an outer corner of the floor 24 at a pivot axis 34. Thus, as the outer wall 16 is moved outward, away from the main section, the floor 24 may move downward along the track, via an interconnection provided by the pivot connector 32.

Figure 5A:
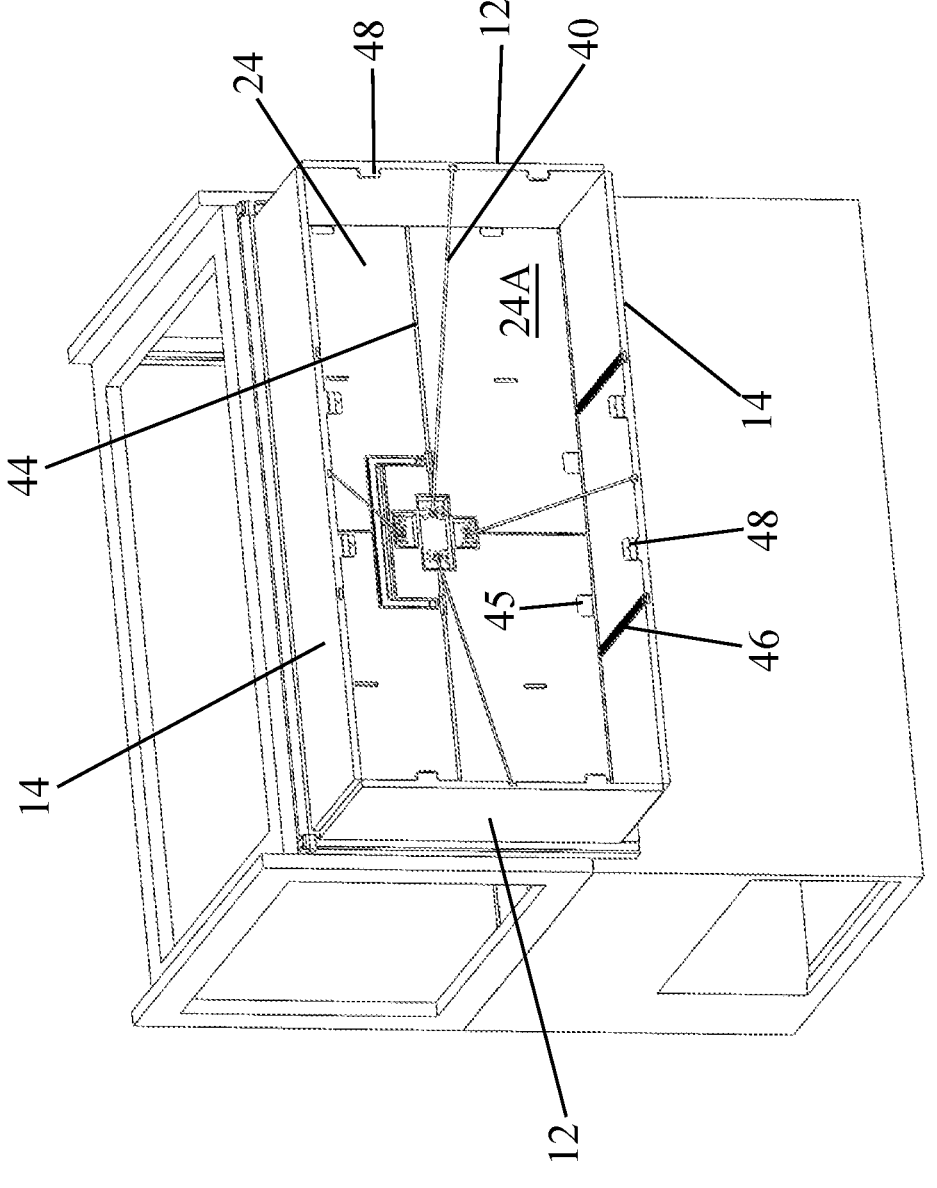
FIG. 5A illustrates a bottom view of the expandable home structure of FIG. 2, prior to lowering the floor member.
Figure 5B:
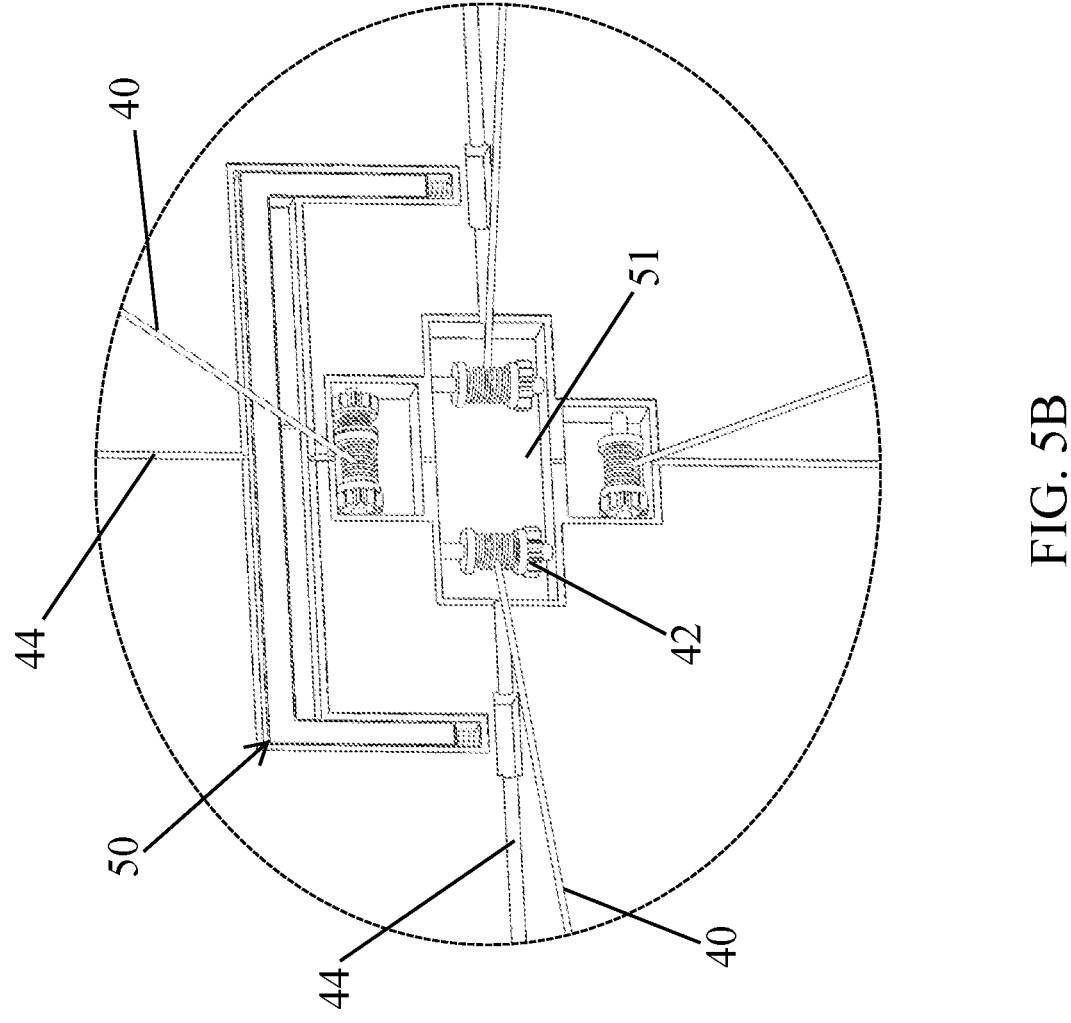
FIG. 5B illustrates a detailed view of a winch and lock region of the bottom of the floor of FIG. 5A.

Referring to FIGS. 5A and 5B, the underside 24A of the floor 24 is shown, where a plurality of winches 42 may be disposed, with cables 40 attached to the coverage walls 12, 14. In some embodiments, four winches 42 may be provided, with one attached to each coverage wall via the cable. In some embodiments, two winches 42 may be provided, where one winch controls the cable to the left and right coverage walls 14 and the other winch controls the cable to the front and rear coverage walls 12. In either case, once the lock mechanism, disposed in the lock locker 50, is released, the left and right coverage walls 14 may lower due to the lengthening of the cable 40, as well as due to gravity. A similar action may be performed when the front and rear coverage walls 12 are lowered. A channel 44 may be provided between the winches (which are typically recessed into the floor 24 so that the coverage walls 12, 14 may fold flat against the underside 24A of the floor 24) and the ends of the underside 24 of the floor. The channel 44 may extend from end to end, centrally, in both directions. The channel 44 may receive the cable 40 when the floor 24 is lowered to its use position, as described below.

Each of the coverage walls 12, 14 may include a floor support tab 48 that extends inward from a lower edge of the coverage walls 12, 14. The floor 24 may include indents 45 formed inward from an outer edge of the underside 24A of the floor 24 that may fit into the floor support tabs 48 when the floor 24 is lowered.

Figure 6:
FIG. 6 illustrates a bottom perspective view of the floor member of the expandable home structure of FIG. 2.

FIG. 6 shows a view of the underside 24A of the floor 24. As can be seen, there is a lock locker 50 and a winch locker 51 recessed into the underside 24A. Further, there are widthwise slots 49 cut into the underside 24 for receiving the floor retention tabs of the front and rear coverage walls 12 (see FIG. 5A). Further, there may be lengthwise slots 60 cut into the underside 24 for receiving the floor retention tabs 48 of the left and right coverage walls 12 (see FIG. 5A). Further, the lock locker 50 may communicate with the lengthwise slots 60, to lock the left and right coverage walls 14 in the stowed configuration, as described below.

Further, the outer edge of the floor 24 may include cut-out regions 47 that may hold winch motors and/or gears to move the floor 24 along teeth 46 formed along inside edges of the coverage walls 14, as discussed in greater detail below. While the teeth 46 are shown along the left and right coverage walls 14, they may be formed in various numbers along various locations of any of the left, right, front and/or rear coverage walls 12, 14.

Figure 7:
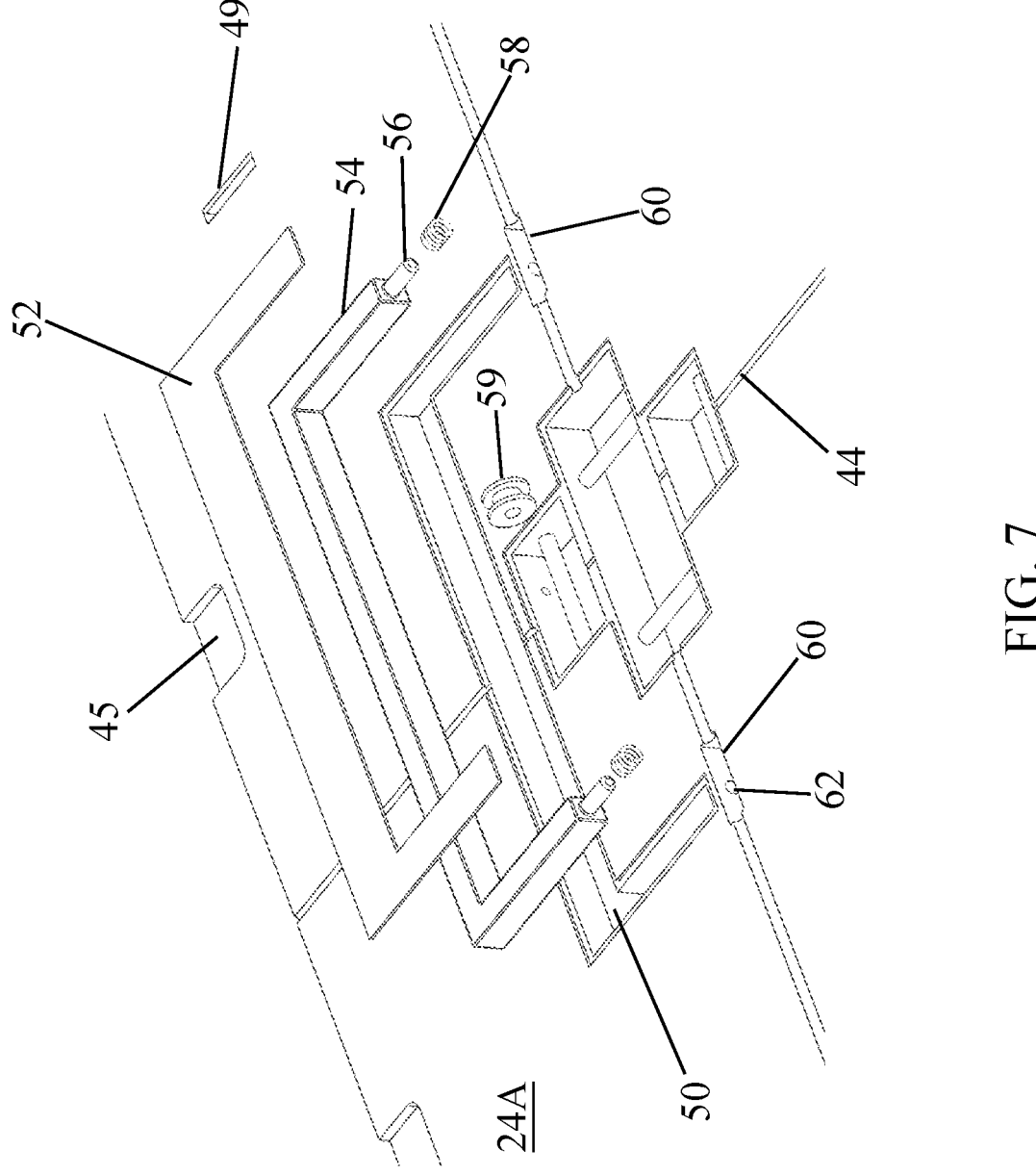
FIG. 7 illustrates an exploded view of a locking mechanism for the left and right coverage panels of the expandable home structure of FIG. 2.
Figure 8:
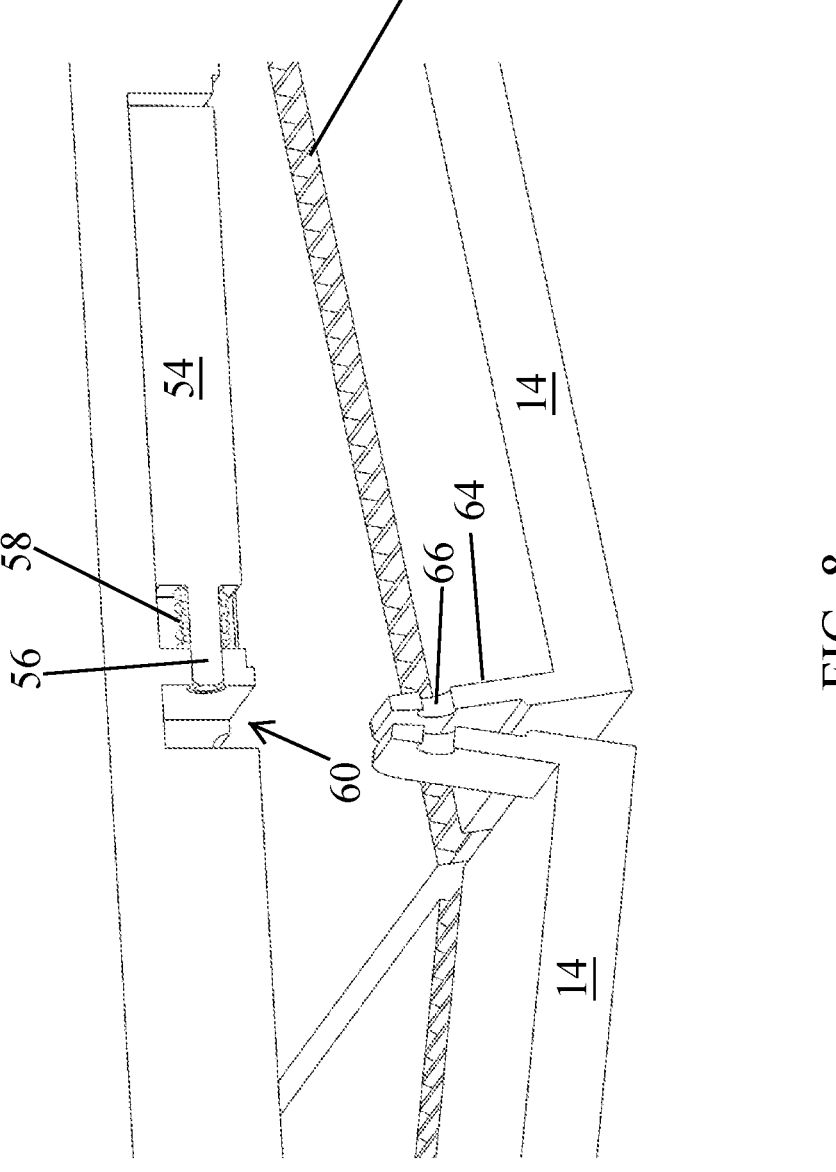
FIG. 8 illustrates a detailed view showing the locking mechanism pulled back to either release (when unfolding) or stow (when folding) the left and right coverage panels.

Referring to FIGS. 7 and 8, details of the locking mechanism are described. The lock locker 50 can include, under a locker cover 52, a lock bar 54, having ends 56 that may be urged into the lengthwise slots 60 by a spring 58, for example. The ends 56 may be moved out of the lengthwise slots 60, through the openings 62, as shown in FIGS. 7 and 8, to release the coverage walls 14. The floor support tabs 64 can include an opening 66 for receiving the ends 56 of the lock bar 54 when the coverage walls 14 are fully raised to lock the coverage walls 14 in the stowed position. A winch 59 may be provided to resiliently urge the ends 56 of the lock bar 54 out of the lengthwise slot 60. When the force provided by the winch 59 is released, the ends 56 may be urged back into the lengthwise slot 60 by a force provided by the springs 58. Of course, other methods may be provided for moving the lock bar, including a linear actuator, hydraulic drive, pneumatic drive, or the like.

Figure 9:
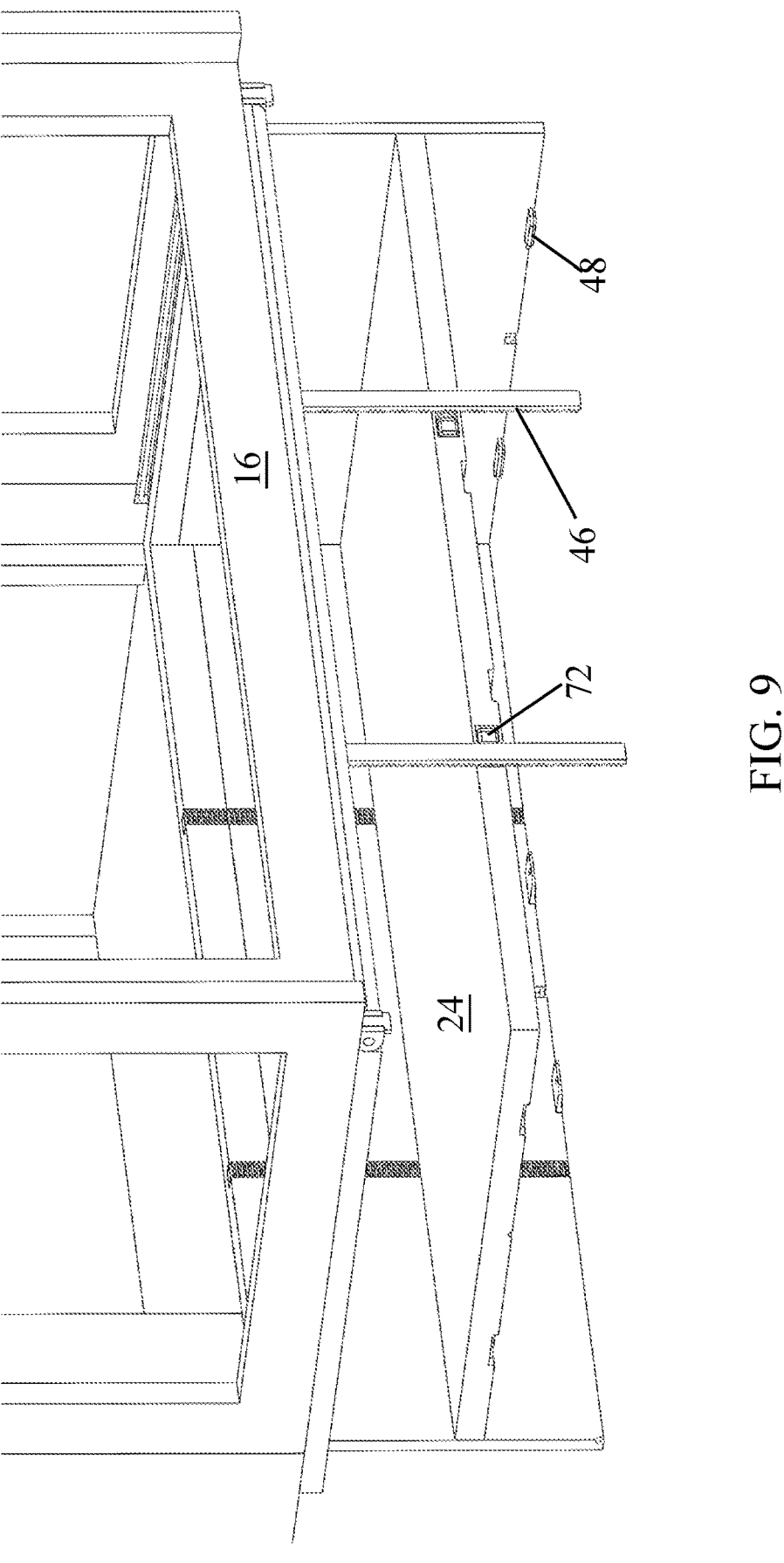
FIG. 9 illustrates a partially cut-away view showing lowering of the floor structure into the sunken position.
Figure 10:
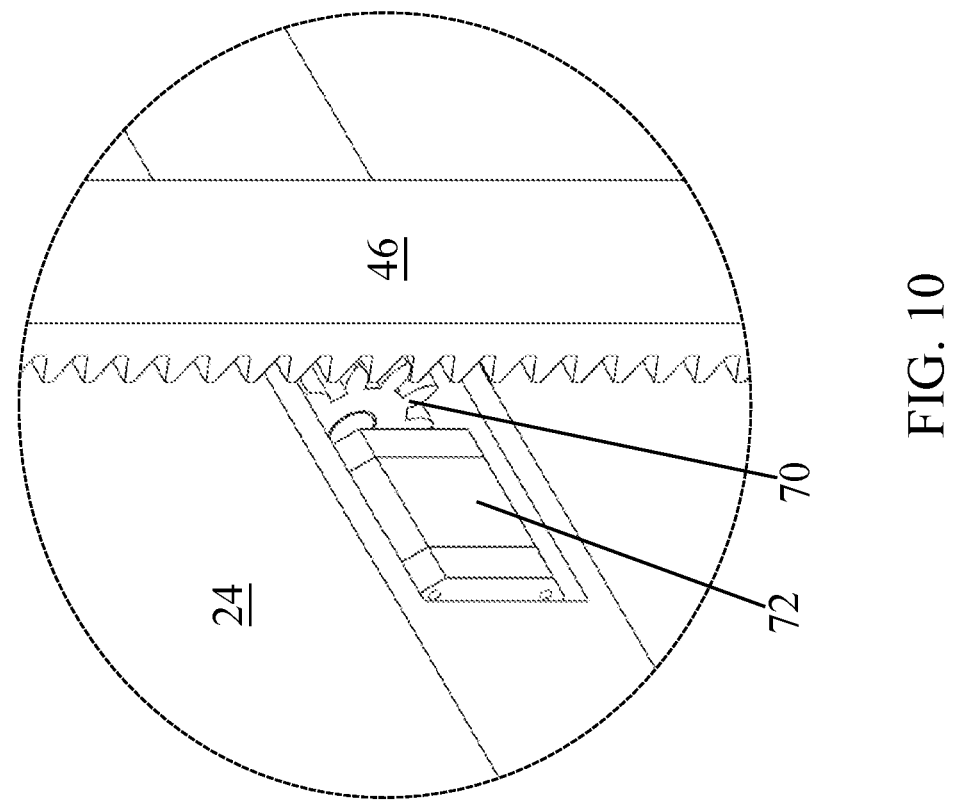
FIG. 10 illustrates a detailed view, taken from FIG. 9, of the floor member moving along a track that can be formed in the front, rear, left and/or right coverage panels.

Referring to FIG. 9, a detailed view of the teeth 46 that are disposed in the coverage walls 12, 14 (not shown for clarity) is shown, where the floor 24 can be moved along the teeth 46 through a gear 70 that may be driven by a motor 70, for example. Of course, other methods for raising and lowering the floor may be provided.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An expandable home comprising:
a main structure;
an expansion section, the expansion section expandable outward in a first direction from a first side of the main structure;
a floor structure folding adjacent the main structure in a folded configuration and movable vertically downward once the expansion section is unfolded to the expanded configuration;
a first coverage wall and a second coverage wall foldable against an underside of the floor structure in the folded configuration, and extending downward from a first edge and a second edge of the floor structure in the expanded configuration;
a third coverage wall and a fourth coverage wall foldable against the underside of the floor structure in the folded configuration, and extending downward from a third edge and a fourth edge of the floor structure in the expanded configuration; and
a track formed along an inside edge of the first coverage wall and the second coverage wall and/or the third coverage wall and the fourth coverage wall, the track extending vertically when in the expanded configuration.

2. The expandable home of claim 1, further comprising driven gears formed in a recess in the first coverage wall and the second coverage wall, and/or the third coverage wall and the fourth coverage wall, the driven gears extend outward beyond the first coverage wall and the second coverage wall, and/or the third coverage wall and the fourth coverage wall, the driven gears engaging with the tracks such that turning of the driven gears move the floor structure vertically between a raised position and a sunken position.

3. The expandable home of claim 2, further comprising floor retention tabs extending inward from an inside surface along a lower edge of first coverage wall and the second coverage wall, and/or the third coverage wall and the fourth coverage wall, the floor retention tabs supporting an edge of the underside of the floor structure when the floor structure is lowered to the sunken position.

4. The expandable home of claim 3, wherein the floor structure includes indents in the underside for receiving the floor retention tabs there in when the floor structure is in the sunken position.

5. The expandable home of claim 1, wherein the underside of the floor structure includes a winch locker housing winches, the winches operable to release a cables that extends to a bottom edge of each of the first coverage wall, the second coverage wall, the third coverage wall, and the fourth coverage wall, where releasing the cables permits the first coverage wall, the second coverage wall, the third coverage wall, and the fourth coverage wall to pivot toward the expanded configuration.

6. The expandable home of claim 5, further comprising channels formed along the undersurface of the floor structure, the channels receiving the cables when the floor is moved to the sunken position.

7. The expandable home of claim 1, further comprising a lock locker formed in a recess in the underside of the floor structure, the lock locker housing a lock bar having ends movable between a first position, that locks the third coverage wall and the fourth coverage wall in a locked position when folded against the underside of the floor structure, and a second position, that permits the third coverage wall and the fourth coverage wall to move toward the expanded configuration.

8. The expandable home of claim 7, wherein, in the folded configuration, the first coverage wall and the second coverage wall are sandwiched between the underside of the floor structure and the third coverage wall and the fourth coverage wall.

9. The expandable home of claim 8, further comprising:
floor retention tabs extending inward from an inside surface along a lower edge of first coverage wall and the second coverage wall, and/or the third coverage wall and the fourth coverage wall, the floor retention tabs supporting an edge of the underside of the floor structure when the floor structure is lowered to a sunken position;
widthwise slots formed in the underside of the floor structure, the widthwise slots operable to receive the floor retention tabs of the first coverage wall and the second coverage wall when the first coverage wall and the second coverage wall are in the folded configuration; and
lengthwise slots formed in the underside of the floor structure, the lengthwise slots operable to receive the floor retention tabs of the third coverage wall and the fourth coverage wall when the third coverage wall and the fourth coverage wall are in the folded configuration.

10. The expandable home of claim 9, wherein:
the floor retention tabs of the third coverage wall and the fourth coverage wall includes holes formed therethrough; and
the ends of the lock bar extend into the lengthwise slots and further extend through the holes in the floor retention tabs of the third coverage wall and the fourth coverage wall when the third coverage wall and the fourth coverage wall are in the folded configuration, thereby locking the third coverage wall and the fourth coverage wall into the folded configuration.

11. The expandable home of claim 10, further comprising springs urging the ends of the lock bar into the lengthwise slots.

12. The expandable home of claim 10, further comprising a lock bar winch operable to resiliently urge the ends of the lock bar out of the lengthwise slots.

13. The expandable home of claim 1, wherein the floor structure is vertically disposed adjacent the main section in the folded configuration and the floor structure pivots and moves along the outer wall as the outer wall is moved toward the expanded configuration.

14. An expandable home comprising:
a main structure;

an expansion section, the expansion section expandable outward in a first direction from a first side of the main structure;

a floor structure folding adjacent the main structure in a folded configuration and movable vertically downward once the expansion section is unfolded to the expanded configuration;

a first coverage wall and a second coverage wall foldable against an underside of the floor structure in the folded configuration, and extending downward from a first edge and a second edge of the floor structure in the expanded configuration;

a third coverage wall and fourth coverage wall foldable against the underside of the floor structure in the folded configuration, and extending downward from a third edge or fourth edge of the floor structure in the expanded configuration;

floor retention tabs extending inward from an inside surface along a lower edge of the first coverage wall and second coverage wall and/or the third coverage wall and fourth coverage wall, the floor retention tabs supporting an edge of the underside of the floor structure when the floor structure is lowered to a sunken position;

widthwise slots formed in the underside of the floor structure, the widthwise slots operable to receive the floor retention tabs of the first coverage wall and the second coverage wall when the first coverage wall and the second coverage wall are in the folded configuration;

lengthwise slots formed in the underside of the floor structure, the lengthwise slots operable to receive the floor retention tabs of the third coverage wall and the fourth coverage wall when the third coverage wall and the fourth coverage wall are in the folded configuration; and a lock locker formed in a recess in the underside of the floor structure, the lock locker housing a lock bar having ends movable between a first position, that locks the third coverage wall and the fourth coverage wall in a locked position when folded against the underside of the floor structure, and a second position, that permits the third coverage wall and the fourth coverage wall to move toward the expanded configuration, wherein:

the floor retention tabs of the third coverage wall and the fourth coverage wall include holes formed therethrough; and the ends of the lock bar extend into the lengthwise slots and further extend through the holes in the floor retention tabs of the third coverage wall and the fourth coverage wall when the third coverage wall and the fourth coverage wall are in the folded configuration, thereby locking the third coverage wall and the fourth coverage wall into the folded configuration.

15. The expandable home of claim 14, further comprising:

springs urging the ends of the lock bar into the lengthwise slots; and a lock bar winch operable to resiliently urge the ends of the lock bar out of the lengthwise slots.

16. The expandable home of claim 14, wherein the underside of the floor structure includes a winch locker housing winches, the winches operable to release a cables that extends to a bottom edge of each of the first coverage wall, the second coverage wall, the third coverage wall, and the fourth coverage wall, where releasing the cables permits the first coverage wall, the second coverage wall, the third coverage wall, and the fourth coverage wall to pivot toward the expanded configuration, wherein the expandable home further comprises channels formed along an undersurface of the floor structure, the channels receiving the cables when the floor is moved to the sunken position.

17. The expandable home of claim 14, further comprising:

a track formed along an inside edge of the first coverage wall and the second coverage wall, and/or the third coverage wall and the fourth coverage wall, the track extending vertically when in the expanded configuration; and driven gears formed in a recess in the first coverage wall and the second coverage wall, and/or the third coverage wall and the fourth coverage wall, the driven gears extend outward beyond the first coverage wall and the second coverage wall, and/or the third coverage wall and the fourth coverage wall, the driven gears engaging with the tracks such that turning of the driven gears move the floor structure vertically between a raised position and a sunken position.

18. The expandable home of claim 14, further comprising channels formed along an undersurface of the floor structure, wherein:

the underside of the floor structure includes a winch locker housing winches, the winches operable to release a cables that extends to a bottom edge of each of the first coverage wall, the second coverage wall, the third coverage wall, and the fourth coverage wall, where releasing the cables permits the first coverage wall, the second coverage wall, the third coverage wall, and the fourth coverage wall to pivot toward the expanded configuration; and the channels receive the cables when the floor is moved to the sunken position.

* * * * *